United States Patent
Burkert et al.

(10) Patent No.: US 9,981,640 B2
(45) Date of Patent: May 29, 2018

(54) METHOD FOR ASCERTAINING THE OFFSET VALUE OF A SENSOR SIGNAL

(71) Applicant: Robert Bosch GmbH, Stuttgart (DE)

(72) Inventors: Jochen Burkert, Kornwestheim (DE); Marcus Wagner, Lauffen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 210 days.

(21) Appl. No.: 14/651,866

(22) PCT Filed: Nov. 28, 2013

(86) PCT No.: PCT/EP2013/074937
§ 371 (c)(1),
(2) Date: Jun. 12, 2015

(87) PCT Pub. No.: WO2014/090579
PCT Pub. Date: Jun. 19, 2014

(65) Prior Publication Data
US 2015/0329092 A1   Nov. 19, 2015

(30) Foreign Application Priority Data

Dec. 12, 2012  (DE) .................. 10 2012 222 893

(51) Int. Cl.
*B60T 8/172*  (2006.01)
*G01P 21/00*  (2006.01)

(52) U.S. Cl.
CPC .............. *B60T 8/172* (2013.01); *G01P 21/00* (2013.01); *B60T 2250/06* (2013.01)

(58) Field of Classification Search
CPC ..... B60W 30/18118; B60W 30/18018; B60W 40/076; B60W 2550/142;
(Continued)

(56) References Cited

U.S. PATENT DOCUMENTS 5,296,855 A    3/1994  Matsuzaki et al.
2003/0109939 A1*  6/2003  Burgdorf ............. B60G 17/015
                                                 700/38

(Continued)

FOREIGN PATENT DOCUMENTS

CN   101322034 A   12/2008
CN   102686458 A    9/2012
(Continued)

OTHER PUBLICATIONS

International Search Report for PCT/EP2013/074937, dated Mar. 20, 2014.

*Primary Examiner* — Khoi H Tran
*Assistant Examiner* — Charles J Han
(74) *Attorney, Agent, or Firm* — Norton Rose Fulbright US LLP; Gerard Messina

(57) ABSTRACT

A method is described for ascertaining the offset value of a sensor signal in a vehicle after the end of a parking period, in which the vehicle was parked, including the steps
  ascertaining the offset value of the sensor signal prior to the start of the parking period,
  storing the ascertained offset value in a data memory,
  ascertaining the changed offset value of the sensor signal after the end of the parking period from the offset value ascertained prior to the start of the parking period and the sensor signal present after the end of the parking period.

11 Claims, 4 Drawing Sheets

(58) Field of Classification Search
CPC ............ B60W 2710/065; B60T 13/662; B60T 17/221; B60T 2201/06; B60T 2250/06; B60R 2300/806; G01P 21/00
USPC ........................................................ 701/30.8
See application file for complete search history.

(56) References Cited

U.S. PATENT DOCUMENTS

| | | | |
|---|---|---|---|
| 2004/0099044 A1* | 5/2004 | Streit | B60T 8/172 73/1.38 |
| 2004/0158439 A1* | 8/2004 | Kim | G01D 21/02 702/190 |
| 2004/0214054 A1* | 10/2004 | Shige | H01M 8/04365 429/429 |

FOREIGN PATENT DOCUMENTS

| | | |
|---|---|---|
| DE | 10314998 | 6/2004 |
| DE | 102010000867 | 7/2011 |
| EP | 0488594 | 6/1992 |
| WO | WO01/50090 | 7/2011 |

* cited by examiner

METHOD FOR ASCERTAINING THE OFFSET VALUE OF A SENSOR SIGNAL

BACKGROUND INFORMATION

A method and a device for ascertaining the offset value of a longitudinal acceleration sensor are described in German Published Patent Application No. 10 102 54 296 A1. Here, a first inclination variable representing the roadway inclination is ascertained from the output signal of the longitudinal acceleration sensor during a vehicle standstill with an applied brake. After the brake is released following the vehicle standstill, a second inclination variable representing the roadway inclination is ascertained from the output signal of the sensor. The offset of the longitudinal acceleration sensor is ascertained as a function of the two inclination variables.

Frequently, very high demands are placed on the temperature dependency of the offset value of the longitudinal acceleration sensor used for ascertaining the roadway inclination for standstill functions acting on the longitudinal dynamics of a vehicle dynamics control system such as, for example, a hill hold control function. This means that the output signal of the sensor may only have a very weak temperature dependency. In FIG. 1, the offset value of a longitudinal acceleration sensor is shown, for example, as a function of the temperature. In the abscissa direction, the temperature of the sensor increases from left to right.

"LT" means low temperature in the range of −40° C., "NT" means normal temperature in the range of 20° C. and "HT" means a high temperature in the range of 85° C. In the ordinate direction, for example, the offset value is plotted. Letters a, b, c and d denote four different sensors.

As the temperature increases, the offset value in the example of FIG. 1 increases.

If a vehicle is driven for a long time at a high temperature, the offset value of the longitudinal acceleration sensor will increase in the example according to FIG. 1. This value is learned by the long-term offset compensation algorithms and is stored in the control unit when the ignition is off. When the ignition is on, the stored value is reused. However, during the time in which the vehicle was parked and switched off, the temperature is certain to have changed, and thus the prevailing offset. Since this changed offset for the vehicle or the system occurs abruptly when the ignition is on, a short-term offset is assumed, which is not immediately adjustable. This problem is addressed by setting very stringent short-term offsets, i.e., temperature characteristics, as requirements for the sensors. In the example according to FIG. 1, this might mean that only sensor a is considered; sensors b, c and d are, however, discarded because of too severe temperature dependency of the offset value.

SUMMARY

The present invention relates to a method for ascertaining the offset value of a sensor signal in a vehicle after the end of a parking period, in which the vehicle was parked, including the steps
 ascertaining the offset-corrected sensor signal prior to the start of the parking period,
 storing the offset-corrected sensor signal in a data memory,
 ascertaining the changed offset value of the sensor signal after the end of the parking period from the offset-corrected sensor value prior to the start of the parking period and the sensor signal present after the end of the parking period, which was not yet corrected with regard to the offset value.

The present invention prevents a severely erroneous offset value from being ascertained and used for the sensor due to the change of the ambient temperature of the sensor and thus the sensor temperature during the parking operation. If the sensor is installed close to the engine, the engine temperature or engine compartment temperature is the decisive factor for the sensor temperature. This temperature drops during a parking operation. If the sensor is installed under the rear shelf, its temperature may increase rapidly when the vehicle is parked in the sun and the rear shelf is heated due to solar radiation. If the sensor is installed close to the underbody of the vehicle, the sensor may cool very rapidly when the vehicle is parked in snow. Generally, the sensor will assume the temperature at the installation location of the sensor during travel.

One advantageous embodiment of the present invention is characterized in that the changed offset value of the sensor signal after the end of the parking period is ascertained from the difference between the sensor signal present after the end of the parking period and the offset-corrected sensor signal prior to the start of the parking period. The present invention is thus suitable in particular for sensors which detect a variable which has not changed during the parking operation, the offset value of which, however, may change during the parking operation.

One advantageous embodiment of the present invention is characterized in that the changed offset value ascertained after the end of the parking period is subsequently modified with respect to time during a time interval of predefined length according to a predefined time function in such a way that the changed offset value at the end of the time interval assumes the offset value ascertained prior to the start of the parking period. In this case, the property of the offset value that it changes only very slowly is utilized.

One advantageous embodiment of the present invention is characterized in that the parking period is a period of time in which the vehicle's ignition is switched off.

One advantageous embodiment of the present invention is characterized in that the sensor is a longitudinal acceleration sensor.

One advantageous embodiment of the present invention is characterized in that the offset value is ascertained outside of the time interval of predefined length after the end of the parking operation with the aid of low pass filtering of the sensor signal and is replaced during the time interval of predefined length by the ascertained changed offset value.

The present invention further includes a device containing means which are designed for carrying out the method according to the present invention. This is in particular a control unit which is equipped with the program code of the method according to the present invention.

DETAILED DESCRIPTION

Figure 1:
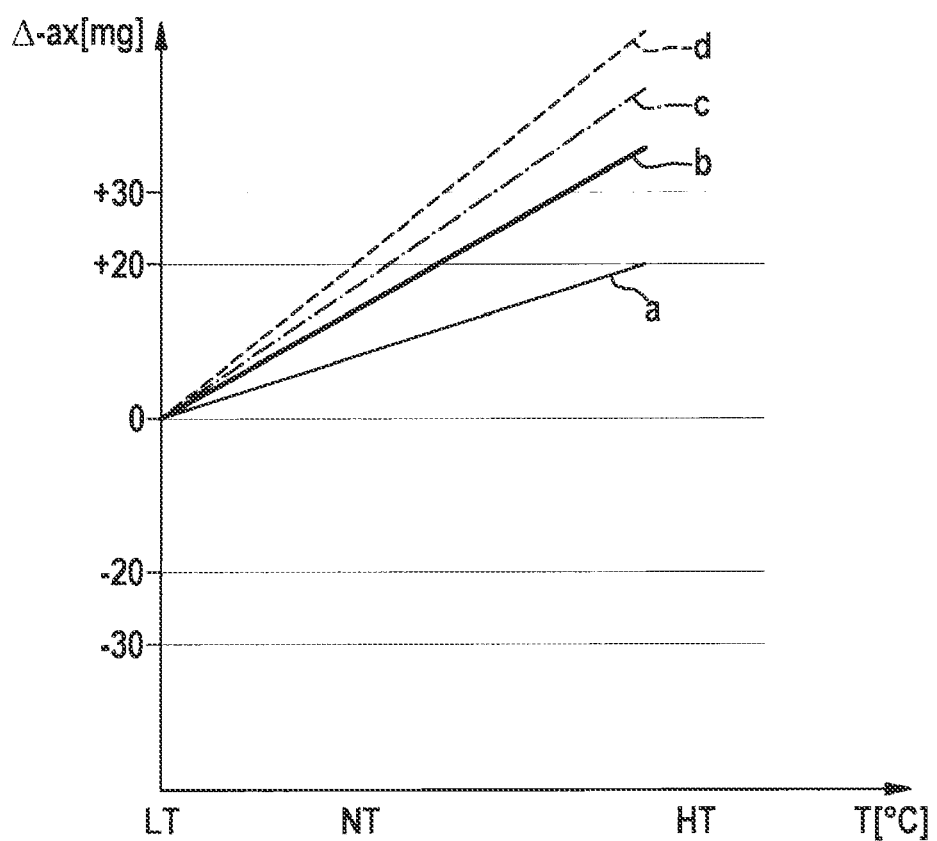
FIG. 1 shows different offset characteristics of longitudinal acceleration sensors as a function of the temperature.
Figure 2:
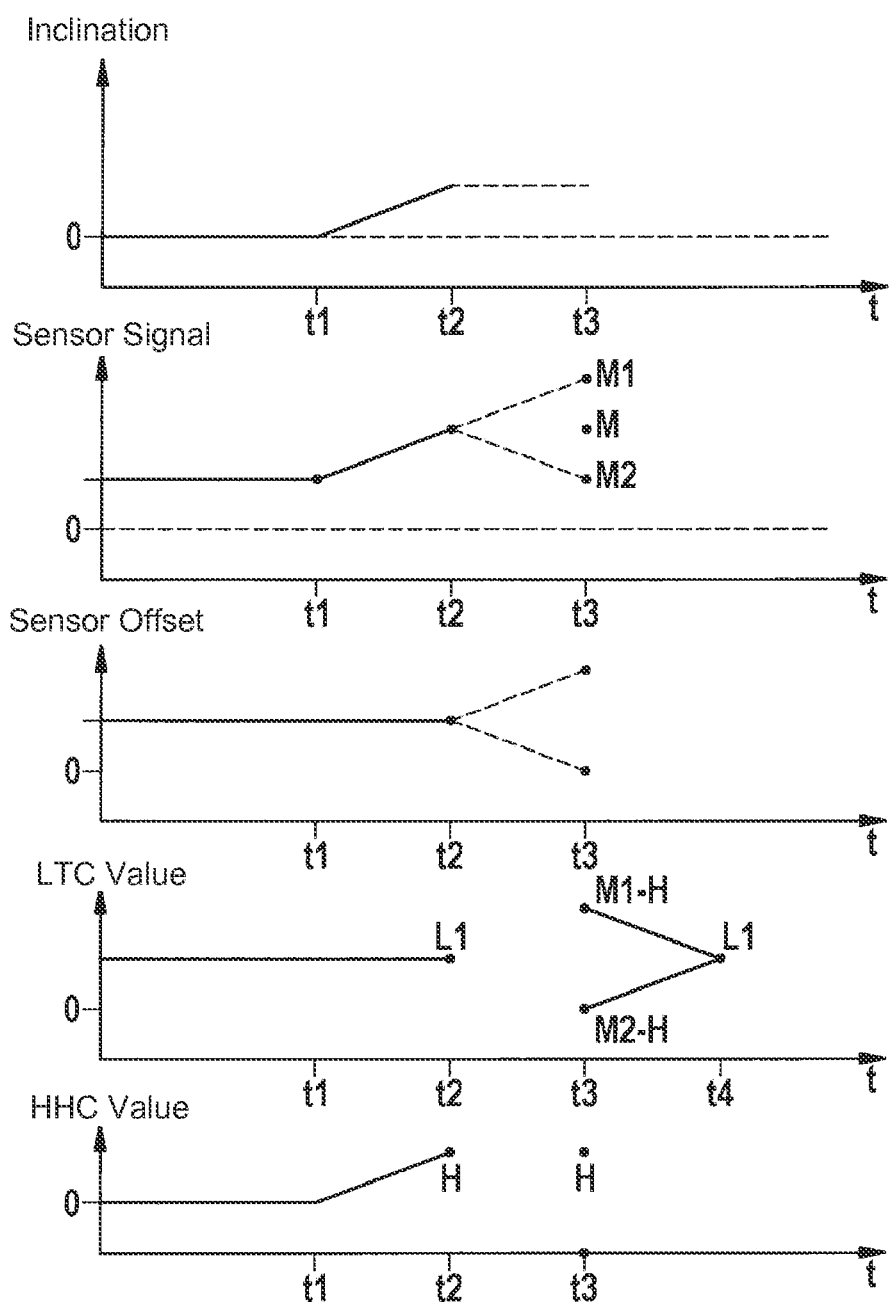
FIG. 2 shows a first embodiment of the present invention based on the chronological curves of selected variables.

FIG. 2 shows five signal curves as a function of time t plotted in each case in the abscissa direction. In the uppermost diagram, the instantaneous roadway inclination is plotted as a function of time t during travel. Until point in time t1, the vehicle moves on a level roadway, after which the roadway inclination increases continuously until time t2. At point in time t2, the vehicle is parked on the inclined roadway and is put back into operation at later point in time t3.

The output signal of a longitudinal acceleration sensor or ax sensor is represented in the second diagram from above in the ordinate direction. This signal has already been corrected with respect to the vehicle longitudinal acceleration and therefore indicates the vehicle inclination. The signal has, however, not yet been corrected with regard to the offset value. Until point in time t1, the signal has a constant value which, however, is different from zero. This constant value, which should actually be zero due to the level roadway, represents the offset value of the used ax sensor. As expected, the output signal increases linearly between t1 and t2, reflecting the gradient curve in the upper diagram. During the parking period between t2 and t3, it is possible for the temperature of the sensor to change markedly, while until point in time t2, the sensor essentially had the temperature of the engine compartment.

After the end of the parking operation, the sensor signal therefore assumes a value M between M1 and M2. M1 and M2 are two extreme temperature scenarios, since the sensor temperature and thus the offset value change during the parking operation. M will generally assume any value between M1 and M2.

The offset value of the sensor is plotted in the ordinate direction in the third diagram from above. It is apparent that the offset value has not changed between t1 and t2. This is explained by the fact that the sensor had a nearly constant temperature, for example, the engine compartment temperature, during this period of time. Starting from t=t2, the offset value changes depending on the temperature scenario.

The LTC value is plotted in the ordinate direction in the fourth diagram from above. The LTC value is understood to be the offset value of the sensor ascertained with the aid of a long-term adjustment. If the offset value of the sensor changes only slowly, the LTC value reflects the offset value very well. If, in contrast, the offset value changes abruptly, the LTC value is adjusted slowly, until it has learned the offset value. The LTC algorithm essentially represents a PT1 filter for the sensor signal. At the end of the parking operation at t=t3, such an abrupt change of the offset value is present, since no ascertainment of the offset value takes place during the parking operation and the LTC filtering was stopped. From t=t3, the PT1 filter is abruptly loaded with a sensor signal for ascertaining the LTC value, the sensor signal having a different offset value compared to point in time t2.

The HHC value is plotted in the fifth diagram from above. This is understood to be the offset-corrected sensor value, i.e., the gradient ascertained with the aid of the sensor. This gradient increases linearly from point in time t1 and reaches value H at holding point in time t2. H denotes the gradient at point in time t2 ascertained with the aid of the sensor.

In the case of the present invention, it is assumed that the roadway inclination has not changed during the parking operation because the vehicle has not been moved. This assumption is almost always correct; rare exceptions may be that the vehicle is towed or the vehicle rolls away with its ignition switched off.

Due to this assumption, the inclination at point in time t3 must be identical to the inclination at point in time t2. The offset-corrected sensor value at point in time t2 was H. The offset-corrected sensor value at point in time t3 must therefore also be H. The sensor value at point in time t3, however, assumes a value M between M1 and M2 due to tolerances and temperature. The offset value at point in time t3 is therefore the difference between the sensor value and H, i.e., for example, M−H.

The difference between the sensor value at point in time t3, for example, M1, and HHC value H at point in time t2 is used in the LTC filtering as an initial value for standstills after the ignition is switched on in the first minutes.

After that, the initial value of the LTC filtering is returned to the old stop value L1 within a predefined time from the mentioned start value, which assumes the value M1−H or the value M2−H in the two extreme scenarios. This return takes place based on a predefined function curve within a predefined time interval extending from t=t3 to t=t4. For example, this may be a linear function, as shown in the fourth diagram from above for the LTC value. The slow return to old stop value L1 is meaningful because after a period of time of typically a few minutes, the sensor has again usually reached the temperature it had prior to the start of the parking operation, for example, the engine compartment temperature, and in this case, essentially has old offset value L1 again.

Figure 3:
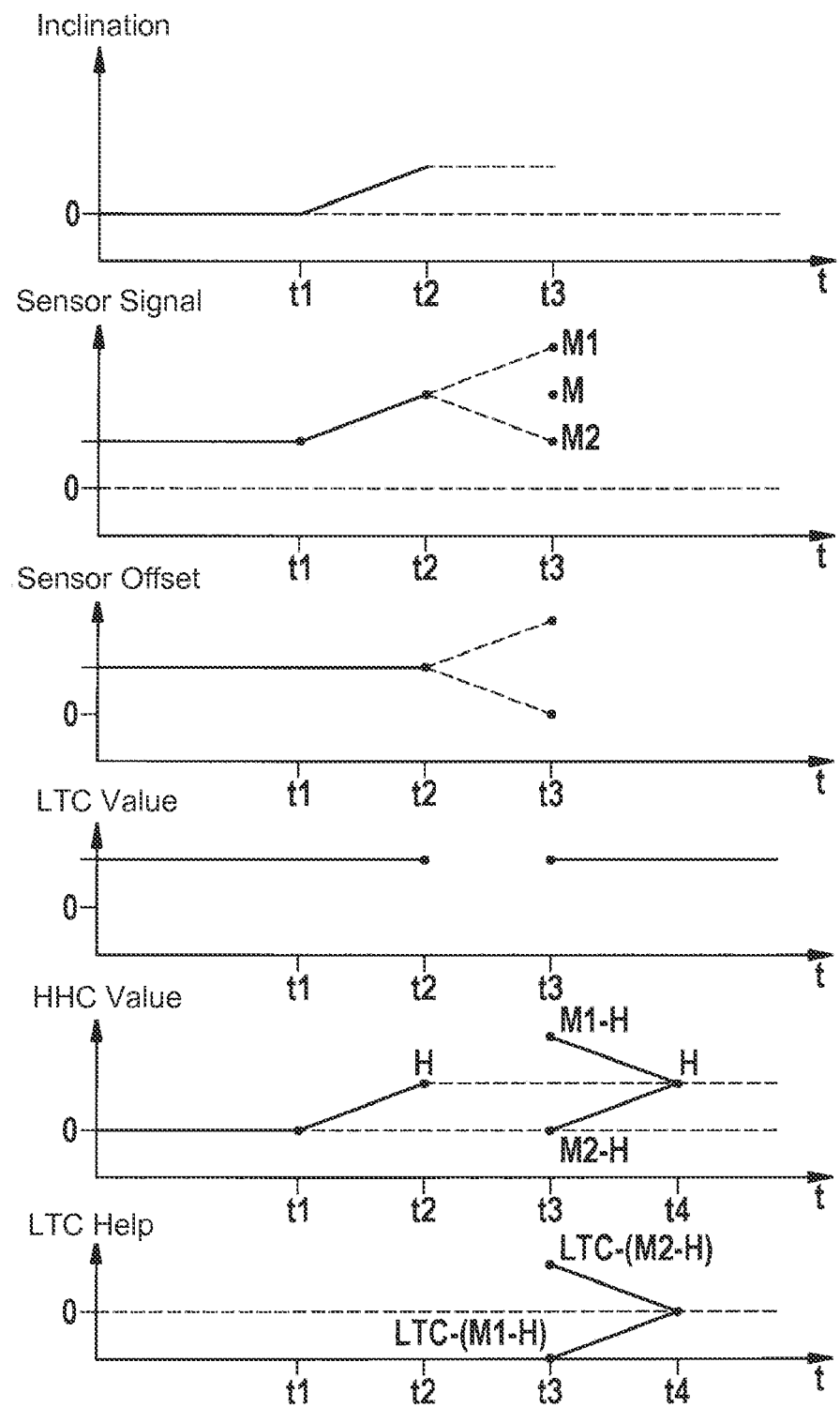
FIG. 3 shows a second embodiment of the present invention based on the chronological curves of selected variables.

A second specific embodiment of the present invention is shown in FIG. 3. The situation under consideration is the same as in FIG. 2. The vehicle is driven on a level roadway until point in time t1 and subsequently moves along a linearly increasing roadway inclination until point in time t2. The ignition is then switched off and the vehicle is parked. At a later point in time t3, the ignition is restarted. During the parking period between t=t2 until t=t3, the vehicle's engine and thus the sensor temperature have cooled, assuming a sensor has been installed in the engine compartment. Similar to FIG. 2, the first three diagrams from above show the chronological curves of the roadway inclination, the output signal of the longitudinal acceleration sensor and the offset value of the sensor. The LTC value is plotted in the fourth diagram from above. In this specific embodiment, this value continues to be calculated fully independently of the parking operation of the vehicle and remains approximately constant. This is due to the fact that the temporary offset change after the vehicle start, caused by the temperature change during the parking operation, is a very brief and thus high-frequency event (period of time of a few minutes until the engine temperature of the sensor is restored), which has no significant influence on the LTC value due to the low pass filtering.

If this LTC value obtained with the aid of low pass filtering continues to be used as an offset value during restart at point in time t3, a false HHC value would result therefrom. Because the temperature has dropped during the parking operation, this LTC value no longer represents the instantaneously present offset value. For that reason, an auxiliary variable LTChelp is introduced in this second specific exemplary embodiment, which is plotted in the lowermost diagram of FIG. 3. The latter is used only in the time interval from t3 to t4 and is zero outside of it.

In the time interval considered, this auxiliary variable is added to the sensor value which is offset-corrected with the aid of the LTC value.

The value of LTChelp at point in time t3 is calculated according to the equation LTChelp=LTC−(M−H).

At point in time t3, this results in an HHC value according to the equation HHC value=(sensor value−LTC)+auxiliary variable=(M−LTC)+(LTC−(M−H))=H.

This means that the HHC value has not changed after the end of the parking operation. This is also clearly understandable since the roadway inclination has not changed. The auxiliary variable has been defined in such a way that the same HHC value results during the start-up operation, although the sensor temperature and thus its offset value have changed.

It may generally be assumed that at point in time t4, the sensor has again been heated to the engine temperature or engine compartment temperature and consequently again has the offset value present at point in time t2. For that reason, auxiliary variable LTChelp is returned from its maximum value LTC−(M−H) to zero according to a predefinable ramp function. This ramp function is in the simplest case a linear function as was also used in FIG. 3. Of course, another function, for example, a parabolic function or an exponential function, may also be used instead of the linear function. The HHC value ascertained with the aid of the described method is shown in the fifth diagram from above.

Figure 4:
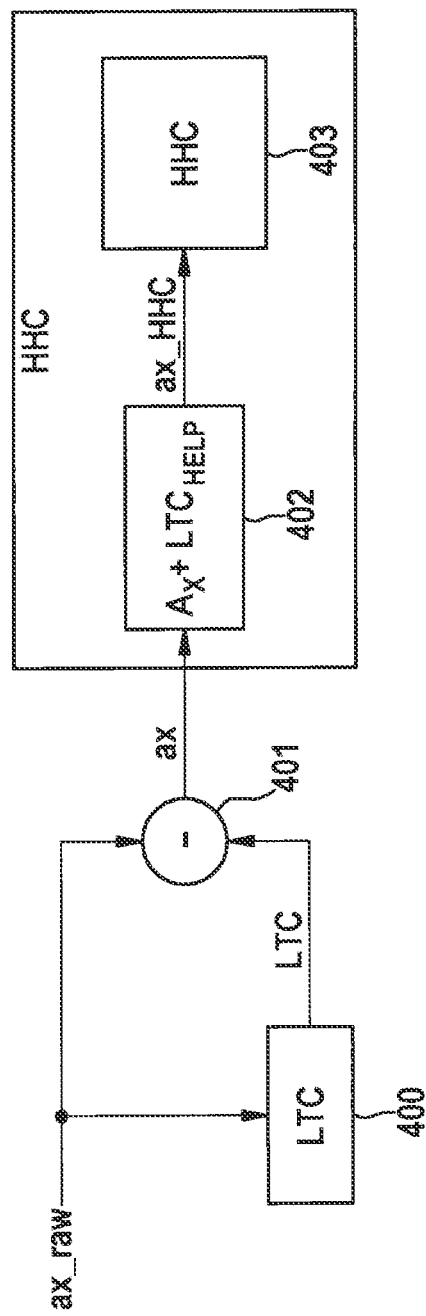
FIG. 4 shows the structure of the second embodiment of the present invention in the form of a block diagram.

The structure of the described second specific embodiment of the method is shown in FIG. 4. The input signal is the sensor signal denoted as ax_raw, which represents the unfiltered and offset output signal of a longitudinal acceleration sensor. However, the longitudinal acceleration has already been subtracted out. At standstill, the longitudinal acceleration is equal to zero. This signal ax_raw is fed to blocks 400 and 401. In block 401, the LTC value of this signal is ascertained via low pass filtering; this LTC value represents the long-term offset value of ax_raw. In subtraction block 401, the LTC value is subtracted from sensor signal ax_raw, i.e., the sensor signal is adjusted for the long-term offset value. It should be noted that sudden changes of the offset value falsify output signal ax. Such a sudden change of the offset value occurs during a parking operation with the ignition switched off. The engine temperature and thus also the sensor temperature generally change during the parking operation, i.e., the offset value of the sensor before the ignition is switched off and the offset value after the sensor is switched on are different. During the parking operation, the sensor signals are not evaluated and thus the offset value is also not ascertained. This means that after the ignition is switched on, an abrupt change of the sensor signal is present caused by the abrupt change of the offset value. For that reason, an auxiliary variable LTChelp is defined, which is added to value ax in block 402 after the ignition is switched on during a time interval of predefined length. This variable LTChelp compensates the offset error exactly immediately after the ignition is switched on, after which this is only approximate. The length of the time interval is selected in such a way that after the end of the time interval, it may be assumed that the sensor has again reached the engine temperature. Signal ax_HHC, which has now also been corrected with the aid of the auxiliary variables, is now available to functions in block 403 such as a hill holder function HHC.

In the exemplary embodiments, the output signal of a longitudinal acceleration sensor was observed. The present invention is also suitable for ascertaining the offset values of other sensors after a parking operation, for example, a yaw rate sensor or a lateral acceleration sensor.

What is claimed is:

1. A method for ascertaining an offset-corrected sensor signal of a sensor in a vehicle after an end of a parking period, in which the vehicle was parked, comprising:
   ascertaining an offset-corrected sensor signal prior to a start of the parking period;
   storing in a data memory the offset-corrected sensor signal ascertained prior to the start of the parking period; and
   ascertaining the offset-corrected sensor signal of the sensor in the vehicle after the end of the parking period from the offset-corrected sensor signal ascertained prior to the start of the parking period and a sensor signal present after the end of the parking period, wherein the offset-corrected sensor signal of the sensor in the vehicle after the end of the parking period is ascertained with the aid of an auxiliary variable, the auxiliary resulting according to an equation LTChelp=LTC−(M−H), wherein LTC denotes an offset value of a sensor signal obtained with the aid of long-term filtering, M denotes the sensor signal, and H denotes the offset-corrected sensor signal prior to the start of the parking period.

2. The method as recited in claim 1, wherein the offset-corrected sensor signal of the sensor in the vehicle after the end of the parking period is ascertained from the sensor signal present after the end of the parking period and an offset value of the sensor signal after the end of the parking period, the offset value of the sensor signal after the end of the parking period being changed by being ascertained from a difference between the sensor signal present after the end of the parking period and the offset-corrected sensor signal prior to the start of the parking period.

3. The method as recited in claim 2, wherein the changed offset value ascertained after the end of the parking period is subsequently modified with respect to time during a time interval of predefined length according to a predefined time function in such a way that the changed offset value at an end of the time interval assumes an offset value ascertained prior to the start of the parking period.

4. The method as recited in claim 1, wherein the auxiliary variable is subsequently modified according to a predefined time function with respect to time in such a way that the auxiliary variable assumes the value zero after an end of a time interval of predefined length.

5. The method as recited in claim 4, wherein the offset-corrected sensor signal of the sensor in the vehicle after the end of the parking period is ascertained by addition of the auxiliary variable to a signal that results from the difference between the sensor signal present after the end of the parking period and the sensor signal ascertained with the aid of low pass filtering.

6. The method as recited in claim 1, wherein the parking period is a period of time in which an ignition of the vehicle is switched off.

7. The method as recited in claim 6, wherein the parking period is a period of time in which the vehicle is in addition not moved and no offset compensation of the sensor signal takes place.

8. The method as recited in claim 1, wherein the end of the parking period is characterized by starting an ignition.

9. The method as recited in claim 1, wherein the sensor includes one of a longitudinal acceleration sensor, a yaw rate sensor, and a lateral acceleration sensor.

10. The method as recited in claim 1, wherein the offset-corrected sensor signal after the end of the parking period is ascertained outside of a time interval of predefined length after an end of the parking operation with the aid of an offset value, the offset value being ascertained with the aid of low pass filtering of the sensor signal present after the end of the parking period.

11. A device, comprising:
an arrangement for carrying out a method for ascertaining an offset-corrected sensor signal of a sensor in a vehicle after an end of a parking period, in which the vehicle was parked, the method comprising:
ascertaining the offset-corrected sensor signal prior to a start of the parking period,
storing in a data memory the offset-corrected sensor signal ascertained prior to the start of the parking period, and
ascertaining the offset-corrected sensor signal of the sensor in the vehicle after the end of the parking period from the offset-corrected sensor signal ascertained prior to the start of the parking period and a sensor signal present after the end of the parking period, wherein the offset-corrected sensor signal of the sensor in the vehicle after the end of the parking period is ascertained with the aid of an auxiliary variable, the auxiliary resulting according to an equation $LTChelp=LTC-(M-H)$, wherein LTC denotes an offset value of a sensor signal obtained with the aid of long-term filtering, M denotes the sensor signal, and H denotes the offset-corrected sensor signal prior to the start of the parking period.

* * * * *